Patented Mar. 9, 1948

2,437,357

UNITED STATES PATENT OFFICE 2,437,357

SOLVENT EXTRACTION OF HYDROCARBONS

Art C. McKinnis, Long Beach, Calif., assignor to Union Oil Company of California, Los Angeles, Calif., a corporation of California No Drawing. Application June 25, 1945, Serial No. 601,546

9 Claims. (Cl. 196—14.27)

The present invention relates to an improvement in the art of separating relatively unsaturated hydrocarbons from relatively saturated hydrocarbons by the processes of extractive distillation and solvent extraction. More particularly the invention relates to improved solvents to be used in these processes.

The use of selective solvents for the separation of organic compounds is well known in the art. Depending upon the relative solubility of the extractive solvents in the organic compounds to be separated the processes of solvent extraction or extractive distillation may be employed, the latter process requiring a more soluble solvent than the former. These processes are useful for obtaining separation of different components of mixtures which have such similar vapor pressures as to make their separation by conventional fractional distillation difficult if not impossible, or to separate compounds which form azeotropes with each other. This invention is directed particularly to the separation of hydrocarbon mixtures which are difficult to separate by conventional means by employing the extractive solvents as hereinafter disclosed for the solvent extraction or extractive distillation of these fractions.

Extractive distillation is carried out either continuously or batchwise by flowing a relatively high boiling solvent, which is selective for one of the components in the feed down a distillation column, as the distillation of the feed proceeds. In this manner the relatively less soluble component passes overhead while the selective solvent strips the more soluble components from the vapor. The resulting hydrocarbon rich solvent containing the dissolved components is withdrawn from the bottom of the column and the dissolved components and solvent may be separated in auxiliary apparatus as for example by fractional distillation, water washing and the like. The recovered solvent is normally returned to the extractive distillation column for use in another cycle.

The process of solvent extraction varies from that of extractive distillation in the operation thereof more than in principle. In the conventional process of solvent extraction the extractive solvent and the feed flow countercurrently in an extraction column, the solvent extracting the more soluble components from the feed. Solvent extraction is limited to those cases wherein the solubility of the solvent in one class of components of the feed is appreciably greater than in another class of components in the feed. If the mutual solubility of the extractive solvent in both classes of components increases the process becomes more difficult and extractive distillation becomes necessary, wherein utilization is made of a decrease in relative volatility of one component brought about by the extractive solvent. However, in many cases the same extractive solvent may be employed in both processes the choice of processes being a function of the feed to be separated.

It is the principal object of my invention to provide an improved class of solvents for the separation of relatively unsaturated hydrocarbons from relatively saturated hydrocarbons capable of being employed for the separation of compounds of only a mild degree of difference in saturation such as for example, a separation of naphthenes from paraffins as well as compounds of a greater degree of difference in saturation such as the separation of aromatics and paraffins.

Further it is an object of my invention to provide an improved process for the separation of relatively unsaturated hydrocarbons from the relatively saturated hydrocarbons involving either extractive distillation or solvent extraction employing the solvents as hereinafter disclosed.

Other objects and advantages of my invention will become apparent to those skilled in the art as the description thereof proceeds.

The function of the solvent in either extractive distillation or solvent extraction is to increase the activity of one class of compounds in the hydrocarbon mixture relative to the other class therein. This increase in relative activities forms the basis of these separation operations. In selecting an extractive solvent for any separation it is necessary to consider such properties of the solvent as stability with reference to heat and chemical reaction, selectively with reference to the mixture to be separated, boiling point relative to the boiling points of the components of the mixture to be separated, melting point in view of possible operational difficulties, corrosiveness towards the equipment employed, toxicity which is important from an operational standpoint and water solubility if water extraction of the solvent from the extract is desired. There are a great many organic solvents in use at the present time for the separation of hydrocarbon mixtures none of which is entirely satisfactory when measured against the above requisites.

I have found that the heterocyclic dinitrogen compounds are excellent solvents for the separation of relatively unsaturated hydrocarbons from relatively saturated hydrocarbons fulfilling the above requisite to a greater degree than any of the previously employed organic solvents. The members of this class of compounds exhibit unusually high stability due presumably to a tautomeric shift of the imino hydrogen making possible a shift of bonds entirely analogous to that occurring in benzene. This sets up a resonance which accounts for the aromatic properties and the high stability of these compounds. Further, I have found that these heterocyclic dinitrogen compounds and particularly those possessing six membered ring structure such as for example pyridazine, having the structural formula

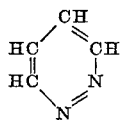

are highly selective towards the relatively unsaturated components of a hydrocarbon mixture. Also the majority of these compounds possess a sufficiently high boiling point to permit ready separation from extracted hydrocarbons boiling in the range of 0 to 100° C. or 150° C. and further, the melting points particularly of the unsymmetrical members of this classification are sufficiently low to permit operations at normal temperatures. Thus pyridazine boils at 208° C. and melts at —8° C. permitting a wide flexibility in its usage. Similarly the more symmetrical pyrimidine with the following structural formula

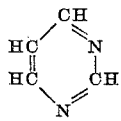

boils at 124° C. and melts at 22° C. Due to more symmetrical nature of the pyrimidine the melting point is higher than that of the pyridazine; however, it is not sufficiently high to prevent its use in either solvent extraction or extractive distillation in those cases where at least slightly elevated temperatures are employed. However, the more symmetrical pyrazine

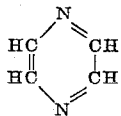

is limited to usage at elevated temperatures only. All of these compounds are neutral to litmus paper although forming salts with strong acids and as a result no problem of corrosion arises in their usage. The toxic effect of these compounds may be compared to that of pyridine which has been reported in the literature as being nontoxic to warm blooded animals whether taken orally or by inhalation. Further, these compounds are water soluble and if so desired may be separated from the extracted hydrocarbon by water washing rather than by fractional distillation. Although the five membered heterocyclic dinitrogen compounds such as pyrazole

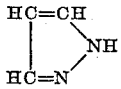

and imidazole

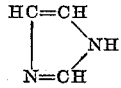

are also good extractive solvents for the separation of relatively unsaturated hydrocarbons from relatively saturated hydrocarbons, the six membered dinitrogen compounds such as pyridazine, pyrimidine, and pyrazine are preferred because of their greater selectivity toward the unsaturated hydrocarbons.

In like manner I prefer to employ the unsymmetrical members of this series inasmuch as an increase in boiling point and a decrease in melting point accompany a lesser degree of symmetry as pointed out above. The benefits of a high boiling point and a low melting point being obvious to those skilled in the art. Although the preferred solvents for the separation according to my invention are unsymmetrical six membered heterocyclic dinitrogen compounds it is within the scope of my invention to employ any of the heterocyclic dinitrogen compounds which conform to the necessary qualifications of boiling point and melting point for the particular separation to be accomplished.

It should be pointed out that the dinitrogen compounds are superior to the mononitrogen heterocyclic compounds and the trinitrogen heterocyclic the former having a higher degree of corrosivity than the dinitrogen compounds and the vapors of the trinitrogen compounds are often explosive.

The use of these solvents in the separation of relatively unsaturated hydrocarbons from relatively saturated hydrocarbons will be governed by the molecular weight of the hydrocarbons to be separated. Thus, as the molecular weight increases the miscibility of the heterocyclic dinitrogen compounds in both components of the mixture decrease to a point where solvent extraction becomes feasible and extractive distillation is replaced thereby. I have found that this critical molecular weight, above which the solvents are more advantageously employed in a solvent extraction process and below which are advantageously employed in an extractive distillation process, is about 150. We do not wish to be limited by the designation of the molecular weight 150 as the dividing line between the use of solvent extraction and extractive distillation inasmuch as this figure will vary depending upon the particular solvent employed as well as the particular hydrocarbon mixture to be separated.

Thus, I prefer to separate such mixtures as toluene and non-aromatics, xylene and non-aromatics, butane and butadiene and like mixtures with a solvent such as pyridazine or the like in a process of extractive distillation whereby the solvent flows through the distillation column stripping the unsaturated components from the saturated components which may be taken overhead in the distillation, the unsaturated hydrocarbon rich solvent being removed from the bottom of the column. Because of the difference in boiling point between most of these dinitrogen compounds and particularly pyridazine and the unsaturated hydrocarbons the latter may be easily separated from the solvent by simple fractional distillation. However, when the molecular weight of the hydrocarbons to be separated approaches or exceeds 150 the miscibility of dinitrogen compounds in the relatively more saturated hydrocarbons decreases to a point at which solvent extraction becomes more feasible than extractive distillation. Therefore, if a lubricating oil fraction is to be treated to remove aromatic hydrocarbons therefrom an extractive solvent according to my invention will be employed in a process of solvent extraction whereby the aromatics exhibiting a considerably greater degree of solubility in the solvent as compared to the more saturated hydrocarbons in the fraction, will be removed therefrom in the solvent phase. Subsequently, the solvent having a lower boiling point than the aromatic extracted may be removed therefrom by simple distillation.

If the relative volatility of one component of a close boiling binary mixture is considerably decreased upon the addition of a third comparatively involatile component, an enrichment of the distillate in one component will be obtained which without the addition of the third component would have been difficult or impossible. When these conditions are satisfied it is possible to obtain rather complete separation of the original components in the binary mixture by using the third component in an extractive distillation process.

*Example I*

The following example is cited as demonstrating the operability of an extractive distillation process employing pyridazine for the separation of benzene from non-aromatic hydrocarbons in the same boiling range.

Fifty-three volumes of benzene and 43 volumes of cyclohexane were added to a distillation flask, and 3 volumes were distilled overhead. The index of refraction of the distillate indicated the distillate to be 60 mol per cent benzene, the same composition as the material in the pot.

Ten volumes of the benzene-cyclohexane mixture having the same composition as the mixture above were added to ninety volumes of pyridazine in a distillation flask and subjected to a controlled distillation. Two volumes of distillate were collected and washed with two volumes of water. The hydrocarbon layer on analysis was shown to be 22 mol per cent benzene. The distillate was then added to 8 volumes pyridazine and distilled and one volume of distillate was again collected. This second distillate contained 8.9 mol per cent benzene. The continuation of this proceduce would be in part analogous to an extractive distillation, and would eventually isolate a small part of the original charge as substantially pure cyclohexane.

*Example II*

A 50 volume sample of hydroformed gasoline containing 85% aromatics was agitated two minutes with one hundred volumes of a mixture of 85% pyridazine in water at 70° F. and allowed to settle several minutes. The extract was drawn off, water added, and the extract oil recovered. This amounted to 27 volumes and showed a solubility in 98% sulfuric acid of 99%.

Having described and illustrated my invention and realizing that many modifications may occur to those skilled in the art without departing from the spirit or scope of the description or of the following claims, I claim:

1. A process for the separation of relatively unsaturated hydrocarbons from relatively saturated hydrocarbons contained in a hydrocarbon fraction which comprises contacting said hydrocarbon fraction with an unsymmetrical heterocyclic dinitrogen compound having a six membered ring to effect a change in the relative activities of said unsaturated and said saturated hydrocarbons whereby the said relatively unsaturated hydrocarbons may be separated together with a major proportion of said heterocyclic dinitrogen compound from said relatively saturated hydrocarbon.

2. A process according to claim 1 in which the unsymmetrical heterocyclic dinitrogen compound is pyridazine.

3. A process for the separation of relatively unsaturated hydrocarbons from relatively saturated hydrocarbons which hydrocarbons have a molecular weight of less than about 150 which comprises extractively distilling said hydrocarbon mixtures in the presence of an unsymmetrical heterocyclic dinitrogen compound having a six membered ring.

4. A process according to claim 3 in which the heterocyclic dinitrogen compound is pyridazine.

5. A process for the separation of relatively unsaturated hydrocarbons from relatively saturated hydrocarbons which hydrocarbons have a molecular weight greater than about 150 comprising solvent extracting said hydrocarbon mixture with an extractive solvent comprising an unsymmetrical heterocyclic dinitrogen compound having a six membered ring.

6. A process according to claim 5 wherein the extractive solvent is pyridazine.

7. A process according to claim 1 in which the unsymmetrical heterocyclic dinitrogen compound is pyrimidine.

8. A process for the separation of aromatic hydrocarbons from a mixture of aromatic and non-aromatic hydrocarbons which comprises contacting said hydrocarbon mixture with an unsymmetrical heterocyclic dinitrogen compound having a six membered ring to effect a change in the relative activities of said aromatic and said non-aromatic hydrocarbons whereby said aromatic hydrocarbons may be separated together with said heterocyclic dinitrogen compound from said non-aromatic hydrocarbons.

9. A process according to claim 8 in which said aromatic hydrocarbons comprise benzene and said dinitrogen compound is pyridazine.

ART C. McKINNIS.

REFERENCES CITED

The following references are of record in the file of this patent:

UNITED STATES PATENTS

| Number | Name | Date |
|---|---|---|
| 2,091,078 | McKittrick et al. | Aug. 24, 1937 |
| 2,092,739 | Van Dijck | Sept. 7, 1937 |
| 2,160,573 | Greensfelder et al. | May 30, 1939 |
| 2,215,915 | Cope et al. | Sept. 24, 1940 |
| 2,285,696 | Dunn | June 9, 1942 |